United States Patent [19]
De Lucia et al.

[11] Patent Number: 5,512,007
[45] Date of Patent: Apr. 30, 1996

[54] SYSTEM AND PROCESS FOR MANUFACTURING A FLEXIBLE CONNECTION IN A HOLLOW METAL DEVICE

[75] Inventors: Frank V. De Lucia, Spring; Tuong T. Le, Houston; Robert W. Jones, Lindale, all of Tex.

[73] Assignee: Astro Machine Works, Inc., Tyler, Tex.

[21] Appl. No.: 129,765

[22] Filed: Sep. 30, 1993

[51] Int. Cl.$^6$ .................................................... B24C 3/00
[52] U.S. Cl. ............................................ 451/75; 451/113
[58] Field of Search ............................ 451/5, 2, 75, 82, 451/38–40

[56] References Cited

U.S. PATENT DOCUMENTS

| | | | |
|---|---|---|---|
| 2,265,082 | 4/1939 | O'Neill | 451/113 |
| 3,260,069 | 7/1966 | Neilson et al. | |
| 3,338,305 | 8/1967 | Pittman et al. | 166/35 |
| 4,648,215 | 3/1987 | Hashish et al. | 451/102 |
| 4,831,790 | 5/1989 | McNally | 451/2 |
| 5,279,075 | 1/1994 | Sage et al. | 451/2 |
| 5,381,631 | 1/1995 | Raghavan et al. | 451/38 |

OTHER PUBLICATIONS

"Designing and Building a Water Jet Cutting Mach." Olsen & Hood, Jul. 1992.
"High–Pressure Jet Cutting", Tikhomirov et al. Jun. 1992.
Sinumerik Primo SG—A CNC Control System For Grinding Machines, Armbruster & Simmer, Nov.–Dec. 1981.
Article entitled "Abrasive Waterjets Come Of Age" published in Machine Design, Published 1990 (6 pages).

Primary Examiner—Bruce M. Kisliuk
Assistant Examiner—Derris H. Banks
Attorney, Agent, or Firm—Jones, Day, Reavis & Pogue

[57] ABSTRACT

A waterjet machining process and system applied to a heat-treated hollow device for cutting a predetermined pattern therein. The hollow device is mounted in the holder that applies rotational, axial, and transverse movements to the hollow metal device as needed in relation to an abrasive water cutting jet stream to cut a predetermined pattern therein. The pattern may be digitized and stored in a computerized numerical controller for moving the holder as necessary to cut the predetermined pattern therein. Inserts may be provided within the hollow device when cutting asymmetrical patterns to protect the inside diameter wall opposite the waterjet from erosion.

23 Claims, 2 Drawing Sheets

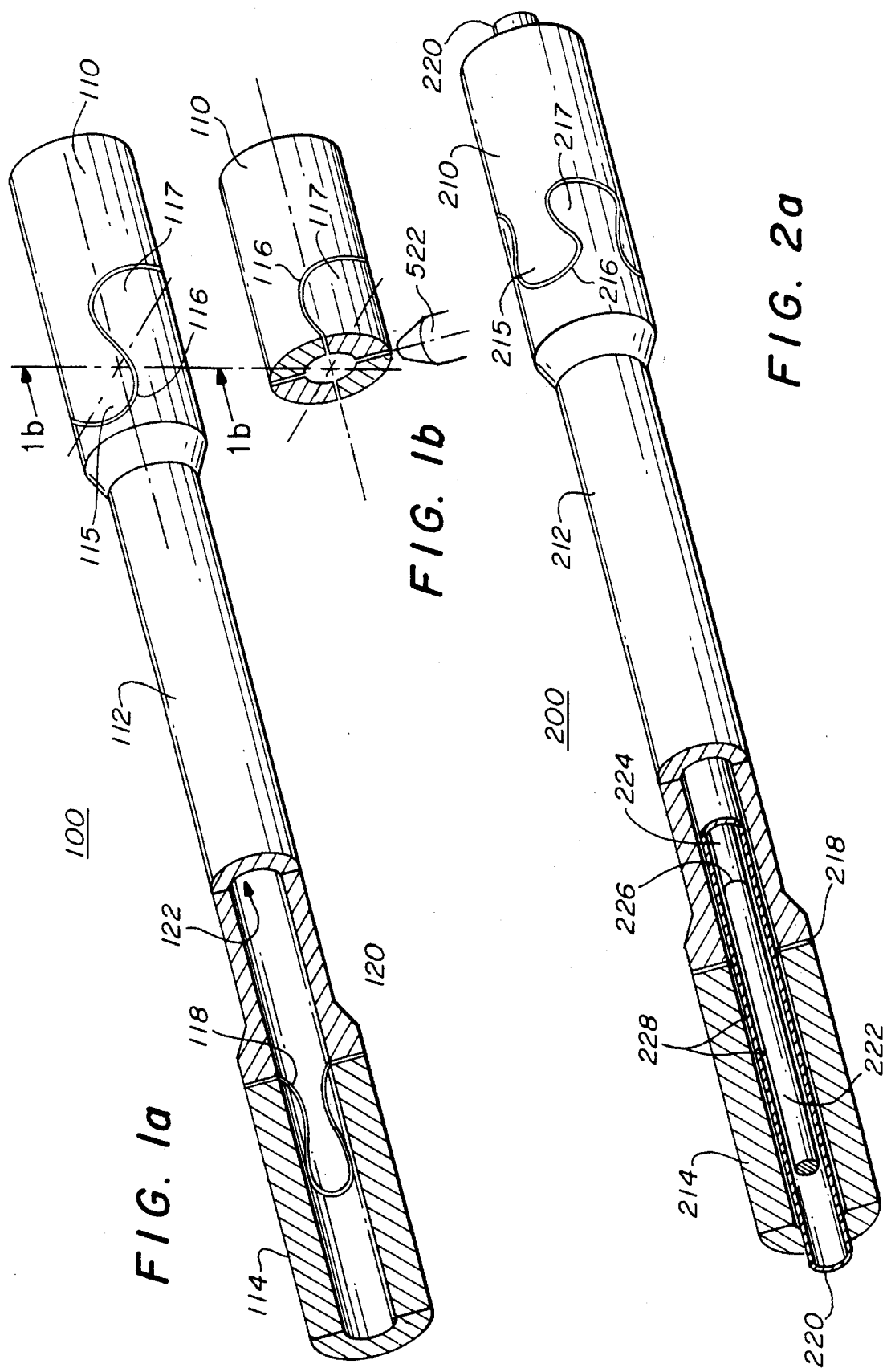

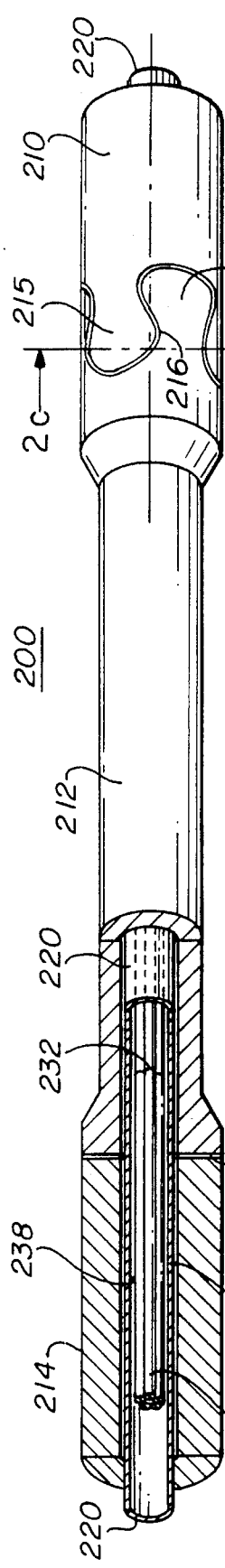
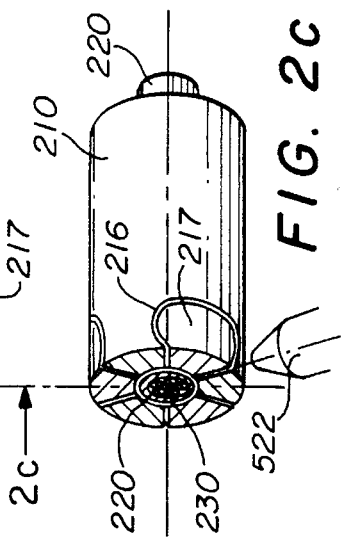
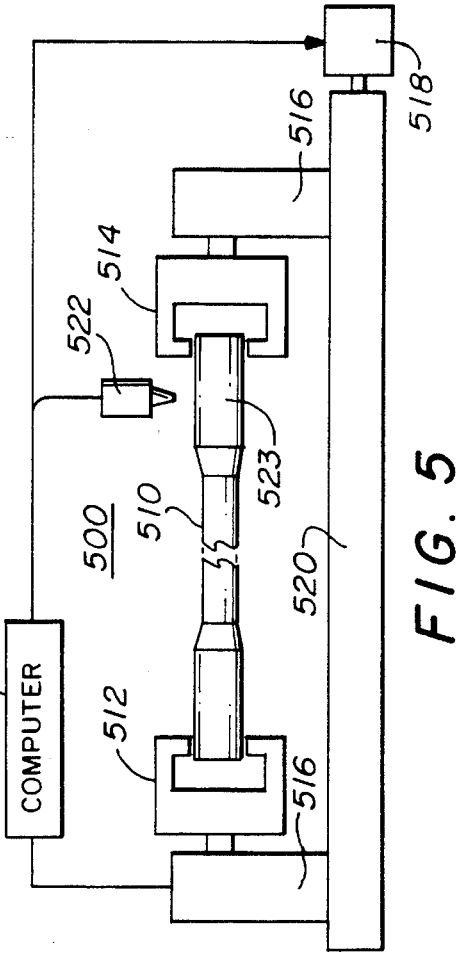
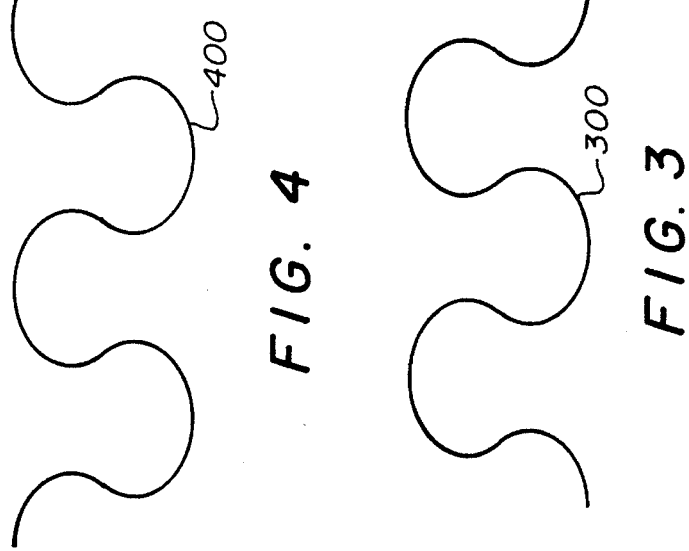
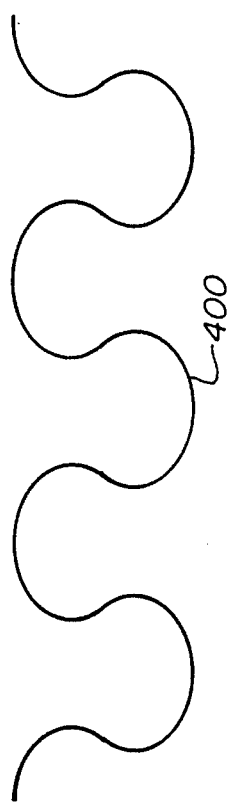

SYSTEM AND PROCESS FOR MANUFACTURING A FLEXIBLE CONNECTION IN A HOLLOW METAL DEVICE

BACKGROUND OF THE INVENTION

1. Field of the Invention

The present invention relates in general to a manufacturing process and system for forming a flexible connection in a hollow metal device and in particular to a method and system that utilizes an abrasive waterjet system and method for a machining the flexible connection in the hollow metal device.

2. Description of the Related Art

Flexible connections that transmit both torque and thrust from a driving element to a driven element are well known in the art. For example, in U.S. Pat. No. 3,260,069, a flexible connection is disclosed for use in the construction of a well drilling apparatus. In such well drilling apparatus, a relatively stationary drill string is employed near the lower end of which there is a fluid operated motor. The motor may be of the type having an outer stator and an inner rotor. The well drilling apparatus, on having circulation fluid discharged downwardly therethrough and through the drill string, functions as a fluid-operated motor and is operatively connected to a rotary well drilling bit that is rotatably mounted at the extreme lower end of the drill string. The rotary well drilling bit rotates about an axis which is stationary in relation to the drill string but the lower end or the rotor of the fluid-operated motor moves in a gyratory path in relation to the drill string. Consequently, a flexible connection must be provided between the gyrating lower end of the motor and the well drilling bit, which rotates about a stationary axis, that will transmit torque from the rotor to the well drilling bit to forcibly rotate the well drilling bit. It is well known that such a connection must not only be flexible and capable of transmitting torque but also should be capable of transmitting thrust so that the rotor will not be expelled by the circulatory fluid from its stator. This, of course, is only one illustration of the type of flexible connection with which the present invention is concerned and it is not to be restricted thereto. On the contrary, it may be employed in any situation where it is desirable or necessary to be able to transmit flexible torques of great magnitude and thrusts of great magnitude.

The flexible connection disclosed in U.S. Pat. No. 3,260,069 is formed in a tubular member that is transversely divided into a plurality of segments having mutually inter-fitting portions that enable torque to be transmitted from each segment to its neighbor. These segments are formed by cutting a heavy walled tube with a cutting torch on tortuous paths such that each segment is, in effect, provided with lobes that loosely fit between corresponding lobes on the adjacent segment. Each lobe is widest near its extremity than elsewhere so that although there is a clearance space between each lobe and the adjacent segment, the segments of the tubular member are, in effect, locked against total separation from each other. Generally, an oxy-acetylene torch is used to cut the tortuous path in the hollow tube. The procedure produces a rough cut finished surface with the inside diameter of the surface typically having burnout points at the bottom of the flexible coupling lobe profile. The burn-out points create stress risers during operation. As a result, the end of the flexible coupling lobe has a tendency to crack and/or break off. In addition, considerable handwork is required because of slag cleanup after the oxy-acetylene torch cutting and because of the rough surface finish of the flexible coupling lobe faces. Further, the rough surface finish of the flexible coupling lobe faces causes premature wear.

A plasma torch cutting procedure improves the flexible coupling lobe surface finish. Even though minimal burn-out points are experienced with this procedure, those remaining burn-out points still create stress risers during operation. Further, even with the plasma torch cutting procedure, there is still considerable handwork related to slag cleanup and premature wear occurs due to the rough surface finish of the flexible coupling lobe faces.

Also, when utilizing the known procedures of oxy-acetylene and plasma torch cutting, the flexible coupling lobe profile must be heat treated after cutting. However, these cutting methods produce an inconsistency in material properties that result in a poor quality heat treatment and carburization within the area of the lobe cut profile.

Further, the previous procedures of oxy-acetylene and plasma torch cutting cause poor consistency of quality in relation to the accuracy of the part. In addition, smaller diameter parts are more difficult to control with respect to good surface finish and a minimum occurrence of burn-out points at the bottom of the flexible coupling lobe profile.

Finally, kerf width requirements are difficult to achieve with the previous procedures of oxy-acetylene and plasma torch cutting.

SUMMARY OF THE INVENTION

The present invention overcomes disadvantages of the prior art by using a waterjet machining process to form the flexible coupling lobe profile. The waterjet machining process utilizes a high pressure waterjet cutting stream with an abrasive material therein. The use of the abrasive waterjet improves the flexible coupling lobe surface finish and reduces premature wear. Further, it eliminates considerable handwork related to slag cleanup that was necessary after oxy-acetylene and plasma torch cutting. In addition, the present invention eliminates the need for shot peening after cutting. Shot peening is required with oxy-acetylene cutting to reduce stress risers located within burn-out points. Also, with the present invention, the part in question can be heat treated prior to the waterjet cutting thereby ensuring an even and consistent heat treatment across the flexible coupling lobe faces.

In the present invention, the hollow metal device that is to have the predetermined pattern cut therein is mounted axially in a holder. The pattern to be cut is depicted in a visual representation and the visual representation is digitized and stored in a computerized numerical controller (CNC). The CNC is then connected to the holder to impart at least a selected one of rotational, axial, and transverse movements to the hollow device. An abrasive waterjet head is positioned adjacent one wall of the hollow metal device in cutting relationship to machine the pattern therein. The computerized numerical computer operates the abrasive waterjet head while simultaneously moving the holder with the hollow metal device therein in a predetermined pattern to machine the predetermined pattern in the adjacent wall of the hollow metal device.

If the pattern to be cut in the hollow metal device or tube is symmetrical with respect to a diameter of the tube that is perpendicular to the axis of the abrasive waterjet, then the pattern can be cut through both walls substantially simultaneously while the hollow device is being moved in the holder. If, however, the pattern to be cut in the hollow tube or device is nonsymmetrical, then the inside diameter wall opposite the abrasive waterjet must be protected from the abrasive waterjet itself. In the present invention, this is accomplished by inserting a hollow metal sleeve within the interior of the hollow device in loose fitting arrangement and then inserting within the loose fitting sleeve at least one second insert to serve as a sacrificial insert. Such sacrificial inserts are formed of a material highly resistant to the abrasive waterjet such as but not limited to tungsten carbide. Thus the inner sleeve and the sacrificial inserts provide a diffusing media for the waterjet and eliminate wash or erosion of that inside diameter of the hollow device. In addition, the abrasive waterjet pressure is in the range of 10,000 to 40,000 psi. The cutting speed is in the range of 0.5 to 4.0 inches per minute. The abrasive used in the waterjet is preferably garnet material having a size in the range of 80 to 120 mesh. All of these factors combined result in a smooth even cut with no damage to the opposite wall inside diameter. Kerf width can be accurately controlled because the nozzle standoff is typically equal to kerf width with these pressures and cutting rates.

Thus the actual part is first heat treated and then set up to be waterjet cut. The part is mounted on a rotating mandrel that is gear driven at a controlled rate by a CNC controller that controls the axial travel rate of the part as well. The entire lobe profile is programmed within the CNC controller thereby eliminating the need for mechanical or optical tracers that inherently produce machining errors. Further, the rotating mandrel can also be controlled in transverse movement by the CNC controller if desired and necessary.

Thus, it is an object of the present invention to provide a flexible coupling manufacturing process and system that utilizes an abrasive waterjet to cut or machine a tortuous path in heat-treated material to form the flexible coupling.

It is also an object of the present invention to waterjet cut the part after heat treating of the part to ensure an even and consistent material's physical property across the flexible coupling lobe faces.

It is still another object of the present invention to utilize an abrasive waterjet to form a flexible coupling lobe that provides a surface finish that does not require handwork to finish the part, thereby providing economy of manufacture and a part with reduced stress risers therein.

It is yet another object of the present invention to provide a system and method for cutting a tortuous path in a hollow metal tube where, if the pattern is symmetrical, the abrasive waterjet can cut the pattern through both opposing walls substantially simultaneously.

It is still further an object of the present invention to utilize an abrasive waterjet to cut a tortuous path in a hollow tube wherein, if the pattern or path to be cut is nonsymmetrical, the inside diameter wall opposite the waterjet is protected from the abrasive waterjet as the part is being rotated to form the pattern.

Thus, the present invention relates to a method of machining a pattern in a hollow metal device such as a hollow cylinder having an inside diameter and opposed walls, the method comprising the steps of mounting the hollow metal device axially in a holder to impart at least a selected one of rotational, axial, and transverse movements to the hollow device in a predetermined pattern, positioning an abrasive waterjet head adjacent one wall of the hollow metal device in cutting relationship to machine the pattern, and operating the abrasive waterjet while simultaneously moving the holder with the hollow metal device in the predetermined pattern to machine the predetermined pattern in the adjacent one wall of the hollow metal device.

The invention also relates to a system for machining a symmetrical pattern in a hollow metal device, such as a hollow cylinder, the hollow metal device having an inside diameter and opposed walls, the system comprising a holding device for receiving the hollow metal device, drive means coupled to the holding device for causing movement of the hollow metal device in at least one of rotational, axial, and transverse directions according to a predetermined pattern, an abrasive waterjet head positioned adjacent one wall of the hollow metal device in cutting relationship to machine the pattern, and control means for operating the abrasive waterjet head while simultaneously moving the holder with the hollow metal device in said predetermined pattern to machine said predetermined pattern in said wall of the hollow metal device.

BRIEF DESCRIPTION OF THE DRAWINGS

These and other objects of the present invention will be more fully disclosed when taken in conjunction with the following detailed description of the drawings in which:

FIG. 1(a) is an isometric view, in partial cross section, of a flexible connection formed by the method and apparatus of the present invention;

FIG. 1 (b) is a cross-sectional view of the flexible connection of FIG. 1(a) taken along the plane 1(b);

FIG. 2(a) is an isometric view of a flexible connection formed by the present system and method in which one solid insert or a plurality of inserts are used as sacrificial inserts to protect the inside diameter wall opposing the abrasive waterjet;

FIG. 2(b) is an isometric view of a flexible connection formed by the present system and method in which a plurality of inserts with their longitudinal axes parallel to each other are used as the sacrificial inserts;

FIG. 2(c) is a cross-sectional view of the flexible connection of FIG. 2(b) taken along plane 2(c);

FIG. 3 is a visual representation of a symmetrical pattern to be cut in the hollow metal tube to form the flexible connection;

FIG. 4 is a visual representation of a nonsymmetrical pattern to be cut in a hollow tube or device by the system and the method of the present invention; and FIG. 5 is a diagrammatic representation of the apparatus for cutting the predetermined pattern in a hollow metal device to form a flexible connection.

DETAILED DESCRIPTION OF THE DRAWINGS

While the following detailed description of the invention will utilize a hollow metal tube to illustrate the system and method of the present invention, it is to be understood that the invention is not limited to cutting patterns in hollow metal tubes but includes cutting patterns in other hollow metal objects of different shapes.

It is to be understood that in each of the embodiments discussed hereafter the hollow metal object is heat treated prior to the abrasive waterjet operation. This is extremely important in the present invention because there is no heat affected zone caused by the cutting process and thus the process allows heat treated and carburized material to be finish cut. By this process, secondary finishing after cutting is eliminated since the cut accuracy is near net dimensions.

FIG. 1 is an isometric view, in partial cross section, of a hollow tube 100 that has been machined with the abrasive waterjet of the present invention to provide cuts along the tortuous paths 116 and 118 in tube ends 110 and 114, respectively. Clearly, as many cuts as desired can be made at any desired location or locations along the hollow tube on device 100. The tube 100 has a center portion 112. The tortuous paths 116 and 118 are symmetrical paths such as that shown by the visual representation 300 in FIG. 3. This means that there is a lobe such as 115 and 117 each 90° around tube 100. Because the patterns 116 and 118 are symmetrical as illustrated by the visual representation 300 in FIG. 3, the cutting of the pattern in opposing sidewalls 120 and 122 can be made simultaneously. Thus, as the tube 100 is being rotated and simultaneously moved axially in a holder as will be shown hereafter, the abrasive waterjet at any given point cuts through the first side or wall 122 and then passes through the hollow center and cuts through the opposing wall 120. Thus the cut is made in both walls substantially simultaneously. Further, the cuts 116 and 118 may be made at a 45° angle circumferentially with respect to each other to create greater flexibility in tube 100. Although only one tortuous cut 116 and 118 is shown in each end 110 and 114 of the hollow tube 100, obviously more than one of such cuts could be made in each end and/or the middle 112 of the tube as necessary.

FIG. 1(b) is a perspective view of a cross section of the tube of FIG. 1(a) taken along plane 1(b) in FIG. 1(a). It illustrates an abrasive waterjet head 522 adjacent cut 116 to form the cut as the tube 100 rotates and moves axially as needed as will be described hereafter.

If an asymmetrical flexible connection is to be made in the hollow tube 200 as illustrated in FIG. 2(a), according to an asymmetrical pattern 400 illustrated in FIG. 4, then both opposing walls cannot be cut at the same time since the patterns will not be in exact alignment on opposing sides of the tube. In such case, when one wall is being cut, the other wall must be protected from damage that would be caused by the waterjet stream energy. As shown in FIG. 2(a), the hollow tube 200 again has outer ends 210 and 214 and an inner portion or center section 212. The asymmetrical cuts 216 and 218 are to be formed in the corresponding outer ends 210 and 214 with the abrasive waterjet of the present invention. As the hollow tube 200 is being rotated and simultaneously moved axially in the holder as will be shown hereafter, the abrasive waterjet cuts the profiles 216 and 218. However, to protect the inside diameter opposite wall, a metal sleeve 220, made preferably of steel, is inserted in loose fitting arrangement inside the hollow tube 200. The loose fitting arrangement has a clearance in the range of 0.005 inch to 0.025 inch on each side as illustrated by the numeral 228. In addition, there must be a second sacrificial material inserted within the metal sleeve 220. This sacrificial material is preferably in the form of, but not limited to, a tungsten carbide material to provide a diffusing media for the waterjet and eliminate the inside diameter wash or erosion on the tube wall opposite the abrasive jet. This second insert may be either a solid rod 222 as illustrated in FIG. 2(a) or a plurality of rods 230 as illustrated in FIG. 2(b) with their axes all parallel to each other. Further, either the solid rod 222 or the plurality of smaller rods 230 may be of one length to fill the entire hollow tube 200 or may be in smaller sections such as 222 and 224 in FIG. 2(a) that abut each other as indicated by line 226 or sections 230 and 234 in FIG. 2(b) or that abut each other as indicated by line 232. Thus, as one of the inserts in 222 in FIG. 2(a) or the plurality of inserts 230 in FIG. 2(b) becomes sufficiently eroded that they need to be replaced, the rod 222 in FIG. 2(a) or plurality of rods 230 in FIG. 2(b) can be forced to the left in FIG. 2(a) or in FIG. 2(b) such that the eroded section is removed from the tube 200 and a new section can be inserted at the other end thereof. Thus, maximum efficient use can be made of the tungsten carbide inserts until they are sufficiently eroded.

In FIG. 2(a), the second insert 222, preferably in the form of tungsten carbide as stated earlier, is inserted in the tube 200 in a loose-fitting arrangement inside steel sleeve 220. Again, the loose-fitting arrangement may have a clearance in the range of 0.015 inch to 0.075 inch on each side as illustrated by the numeral 228. Where the inserts are in sections such as 222 in FIG. 2(a) or section 230 in FIG. 2(b), the sections are typically three and a half inches long and substantially fill the inside diameter of metal sleeve 220. In FIG. 2(b), typically four or five rods may be required. They are typically 0.281 inches in diameter and, again, are approximately 3 and a half inches long. Of course, the plurality of smaller tube sections 230 in FIG. 2(b) or the individual section 222 illustrated in FIG. 2(a) would be located immediately under the area where the cut is to be made. Thus, in either FIG. 2(a) or FIG. 2(b), the steel sleeve 220 and the single insert 222 in FIG. 2(a) or the multiple parallel inserts 230 in FIG. 2(b) serve to provide a diffusing media for the waterjet and eliminate the inside diameter wash or erosion on the tube wall opposite the abrasive jet. The asymmetric cut 216 can be seen in FIGS. 2(a), 2(b) and 2(c). FIG. 2(c) illustrates the asymmetric nature of the curve 216 by showing a perspective cross-sectional view of the tube 200 taken along plane 2(c) of FIG. 2(b). The plurality of inserts 230 can be seen inside steel sleeve 220. The preferred embodiment of the present invention is illustrated in FIG. 2(b) and 2(c) wherein the plurality of rods 230 of tungsten carbide are inserted within the tubular steel sleeve 220. In all of the embodiments, the water pressure of the abrasive waterjet is kept in the range of 10,000 to 40,000 psi. The cutting speed is arranged to be in the range of 0.5 to 4.0 inches per minute and the abrasive material in the waterjet is preferably garnet material having a size of 80–120 mesh. All of these factors combined have resulted in a smooth even cut with no damage to the opposite wall inside diameter of tube 100.

FIG. 5 illustrates the system of the present invention for enabling the flexible connections to be made with the abrasive waterjet. The system 500 includes the hollow tube 510 being mounted in holders 512 and 514 for rotation thereof by motor 516. A second motor 518 is coupled to a base 520 on which the holders 512 and 514 for the hollow tube 510 are mounted. Motor 518 enables a hollow tube 510 in the holders 512 and 514 to be moved axially and, if needed, transversely to the abrasive waterjet head 522. As can be seen in FIG. 5, the abrasive waterjet head 522 is adjacent one wall 523 of one end of the tube 5 10.

The symmetrical or unsymmetrical patterns as illustrated in FIGS. 3 and 4, are digitized and by any well-known means and are stored in the memory of a computerized numerical controller 524. The controller 524 utilizes the stored digitized data to control motors 516 and 518 to move the hollow tube 510 rotationally, axially, and transversely as needed in relation to the waterjet head 522 to provide the proper pattern cut therein. The computerized numerical controller 524 is of any well-known type in the art. In addition, the abrasive waterjet head is also of any type well known in the art.

Thus, there has been disclosed a novel system and method for cutting a pattern in opposing walls of a hollow metal device using an abrasive waterjet. The waterjet machining process utilizes a high pressure waterjet cutting stream with an abrasive therein that cuts a flexible coupling lobe profile. Because of low operating temperatures with this system, the hollow tube or part being cut can be heat treated prior to the cutting. The pattern to be cut can be formed in a visual representation, and then the pattern digitized and stored in a computerized numerical controller, also well known in the art, to drive a hollow device holder rotationally, axially, and transversely as needed to cut the pattern in the hollow tube or device. If the pattern is symmetrical about the hollow device or tube, the abrasive waterjet can be used to cut opposing sides thereof substantially simultaneously because the waterjet will pass through the first wall, through the hollow space, and then through the second opposing wall.

However, when a nonsymmetrical pattern must be formed in the wall of the hollow tube or device, the inside diameter of the wall opposite the waterjet must be protected. In the present invention this is accomplished with a hollow sleeve, preferably of steel, inserted inside the hollow tube and into the preferred embodiment, a plurality of rods of material resistant to the cutting effects of the abrasive waterjets, such as tungsten carbide, are inserted within the hollow sleeve with their axes parallel to each other. This inner sleeve and plurality of rods provide a diffusing media for the waterjet and eliminate inside diameter wash or erosion of the side wall opposite the waterjet. With this invention, because the hollow tube can be heat treated prior to cutting, and because the abrasive waterjet does not produce heat zones, no secondary finishing is required after cutting since the cut accuracy is near-net dimensions. No shot peening is required to reduce stress risers that are common in prior art cuts and an improved surface finish results in improved wear resistance.

While the invention has been described in connection with a preferred embodiment, it is not intended to limit the scope of the invention to the particular form set forth, but, on the contrary, it is intended to cover such alternatives, :modifications, and equivalents as may be included within the spirit and scope of the invention as defined by the appended claims.

We claim:

1. A method for cutting a pattern in opposing walls of a hollow device, such as a hollow cylinder having an outside circumference, comprising the steps of:

mounting the hollow device axially in a holder to impart at least two selected ones of rotational, axial, and transverse movements to the hollow device in a predetermined pattern;

positioning an abrasive waterjet head adjacent one wall of the hollow device in cutting relationship to cut said pattern; and cutting said predetermined pattern through the adjacent one wall of the hollow device around the entire circumference by operating the abrasive waterjet device while simultaneously moving the holder with the hollow device in said predetermined pattern.

2. A method as in claim 1 further including the step of coupling a computer controller to the device holder for causing the device holder to move the hollow device in at least two of said rotational, axial, and transverse movements.

3. A method as in claim 2 further including the steps of: forming in a single plane a visual depiction of the pattern to be
   cut in the hollow metal device;
   digitizing the visual depiction of the pattern to be cut;
   storing the digitized depiction of the pattern to be cut; and
   coupling the stored digitized depiction of the pattern to the computer for use by the computer in moving the device holder in at least two of the rotational, axial, and transverse movements in relation to the abrasive waterjet to cut said pattern in said hollow metal device.

4. A method as in claim 1 wherein the step of cutting said predetermined pattern further includes the step of cutting an asymmetrical pattern in said hollow device entirely around the circumference by applying only axial and rotational movements to said hollow device.

5. A method as in claim 4 further including the step of protecting the inside diameter wall of the hollow device opposite the abrasive waterjet from damage by the abrasive waterjet.

6. A method as in claim 5 wherein the step of protecting the inside diameter wall of the hollow metal device further comprises the steps of:

placing a first hollow insert in the hollow metal device in substantially loose touching fit with the inside diameter walls of the hollow metal device; and placing a second insert inside said first insert in substantially loose touching fit, said second insert being formed of a material resistant to the cutting effects of the abrasive waterjet such that, as the asymmetric pattern is being cut in said adjacent one wall by the abrasive waterjet, the opposite wall is not damaged by the abrasive waterjet.

7. A method as in claim 5 wherein the step of protecting the inside diameter wall of the hollow metal device comprise the steps of:

placing a first steel insert in said hollow metal device; and placing a second plurality of inserts inside said first insert in substantially loose touching fit, said record plurality of insert being formed of a material resistant to the cutting effects of the abrasive waterjet such that, as the asymmetric pattern is being cut in said adjacent one wall by the abrasive waterjet, the opposite wall is not damaged by the abrasive waterjet.

8. A method as in clause 7 wherein the plurality of inserts are formed of tungsten carbide.

9. A method as in claim 8 further including the step of coupling a computer controller to the device holder for causing the device holder to move the hollow device in at least two of said rotational, axial, and transverse movements.

10. A method as in claim 9 further including the steps of:

forming a visual depiction of the pattern to be cut in the hollow metal device;

digitizing the visual depiction of the pattern to be cut;

storing the digitized depiction of the pattern to be cut; and coupling the stored digitized depiction of the pattern to the computer for use by the computer in moving the device holder in at least two of the rotational, axial, and transverse movements in relation to the abrasive waterjet to cut said pattern in said hollow device.

11. A method as in claim 1 further including the step of heat treating and/or carburizing the hollow metal device before mounting the hollow device in the holder for cutting.

12. A system for cutting a pattern in a hollow device, such as a hollow cylinder having an outer circumference, the hollow device having an inside diameter and opposed side walls, the system including:

a holding device for receiving the hollow device;

drive means coupled to the holding device for causing movement of the hollow device in at least two of rotational, axial, and transverse directions according to a predetermined pattern;

an abrasive waterjet device positioned adjacent one wall of the hollow device in cutting relationship to cut said pattern; and control means for operating the abrasive waterjet device while simultaneously moving the holder with the hollow device in said predetermined pattern to cut said predetermined pattern through said adjacent one side wall of the hollow device around the entire circumference.

13. A system as in claim 12 wherein the control means includes a computerized numerical controller coupled to the device holder for causing the device holder to move the hollow device in said at least two of said rotational, axial, and transverse movements to cut said pattern.

14. A system as in claim 13 further including:

a visual depiction of the pattern to be cut in the hollow device;

a device for digitizing the visual depiction of the pattern to be cut;

a digital data memory for storing the digitized depiction of the pattern to be cut; and said computerized numerical controller being coupled to said digital data memory for using the digitized pattern depiction to move the device holder in at least two of the rotational, axial, and transverse movements in relation to the abrasive waterjet to cut said pattern through said one side wall and entirely around the circumference of said hollow device.

15. A system as in claim 12 further including a shield mechanism for protecting the inside diameter wall of the hollow device opposite the abrasive waterjet device from damage by the abrasive waterjet.

16. A system as in claim 15 wherein the predetermined pattern cut in the hollow device is an asymmetrical pattern.

17. A system as in claim 15 wherein the shield for protecting the inside diameter wall further comprises:

a first hollow insert in the hollow metal device in substantially loose touching fit with the device inside diameter; and a second insert inside said first insert in substantially loose touching fit, said second insert being formed of a material resistant to the cutting effects of the abrasive waterjet such that, as the pattern is being cut in said adjacent one wall by the abrasive waterjet, the opposite wall is not damaged by the abrasive waterjet.

18. A system as in claim 17 further comprising:

a steel first insert in said hollow metal device; and a plurality of tungsten carbide second inserts inside said first insert with their axes parallel to each other to protect the opposite wall of the hollow metal device from damage by the abrasive waterjet.

19. A system as in claim 18 further comprising:

a visual depiction of the pattern to be machined in the hollow metal device;

a device for digitizing the visual depiction of the pattern to be machined;

a memory for storing the digitized depiction of the pattern to be machined; and said computerized controller being coupled to the memory for using the stored digitized depiction of the pattern in moving the device holder in at least one of the rotational, axial, and transverse movements in relation to the abrasive waterjet to machine said pattern in said hollow metal device.

20. A system as in claim 15 wherein the shield mechanism for protecting the inside diameter wall of the hollow metal device further comprises:

a plurality of axially inserts within the hollow metal device in substantially loose touching fit, said plurality of inserts having their axes in parallel and being formed of a material resistant to the cutting effects of the abrasive waterjets; and replaceable ones of said plurality of inserts that can be successively inserted in the hollow metal device to force said axially aligned inserts that are unacceptably eroded by the abrasive waterjet out of the hollow metal device such that successive inserts replace the eroded inserts.

21. A method as in claim 1 wherein the step of cutting said predetermined pattern further includes the step of cutting a symmetrical pattern through said hollow device entirely around the circumference thereof by applying only axial and transverse movements to said hollow device so as to cut opposing sides of said hollow device simultaneously.

22. A method as in claim 1 wherein the step of cutting said predetermined pattern further includes the step of forming adjacent axially alignable tubular segments having mutually interfitting positions enabling torque to be transmitted from one segment to the next, each segment being capable of having its axis angularly related to the axis of the adjacent segment.

23. A system as in claim 12 wherein said control means cuts said predetermined pattern to form adjacent axially alignable tubular segments having mutually interfitting positions enabling torque to be transmitted from one segment to the next, each segment being capable of having its axis angularly related to the axis of the adjacent segment.

* * * * *